United States Patent
Ogoshi

(10) Patent No.: US 12,326,409 B2
(45) Date of Patent: Jun. 10, 2025

(54) SAMPLE COMPONENT DETERMINATION METHOD, SAMPLE COMPONENT DETERMINATION APPARATUS, LEARNING METHOD AND COMPUTER READABLE NON-TRANSITORY RECORDING MEDIUM

(71) Applicant: Shimadzu Corporation, Kyoto (JP)

(72) Inventor: Akira Ogoshi, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 944 days.

(21) Appl. No.: 17/006,333

(22) Filed: Aug. 28, 2020

(65) Prior Publication Data
US 2021/0131983 A1    May 6, 2021

(30) Foreign Application Priority Data
Nov. 6, 2019    (JP) .................................. 2019-201388

(51) Int. Cl.
| | |
|---|---|
| G01N 23/2209 | (2018.01) |
| G01N 23/2252 | (2018.01) |
| G06N 3/042 | (2023.01) |
| G06N 3/045 | (2023.01) |
| G06N 3/09 | (2023.01) |
| G06N 20/00 | (2019.01) |

(52) U.S. Cl.
CPC ..... *G01N 23/2209* (2018.02); *G01N 23/2252* (2013.01); *G06N 3/042* (2023.01); *G06N 3/045* (2023.01); *G06N 3/09* (2023.01); *G06N 20/00* (2019.01); *G01N 2223/079* (2013.01); *G01N 2223/305* (2013.01)

(58) Field of Classification Search
CPC .......... G01N 23/2209; G01N 23/2252; G01N 2223/079; G01N 2223/305; G06N 3/042; G06N 3/045; G06N 3/09; G06N 20/00
See application file for complete search history.

(56) References Cited

U.S. PATENT DOCUMENTS

| | | | |
|---|---|---|---|
| 4,962,516 A | 10/1990 | Soezima | |
| 2005/0053193 A1* | 3/2005 | Hasegawa ............ | G01N 23/223 378/46 |

(Continued)

FOREIGN PATENT DOCUMENTS

| | | |
|---|---|---|
| CN | 107255647 A | 10/2017 |
| CN | 109307687 A | 2/2019 |

(Continued)

OTHER PUBLICATIONS

Notice of Reasons for Refusal for corresponding Japanese Patent Application No. 2019-201388, dated Jun. 6, 2023.

(Continued)

*Primary Examiner* — Manuel L Barbee
(74) *Attorney, Agent, or Firm* — Muir Patent Law, PLLC

(57) ABSTRACT

The sample component determination method includes: acquiring a spectrum of a sample which is measured by a wavelength dispersive X-ray analyzer; defining a target element to be analyzed in the sample and an input wavelength range corresponding to the target element; and determining a chemical bonding state of the target element in the sample by inputting a partial spectrum of the sample spectrum that falls within the input wavelength range to a first trained model.

19 Claims, 15 Drawing Sheets

(56) References Cited

U.S. PATENT DOCUMENTS

| | | | | |
|---|---|---|---|---|
| 2008/0067379 | A1* | 3/2008 | Notoya | G01N 23/2209 |
| | | | | 250/310 |
| 2009/0052620 | A1* | 2/2009 | Takakura | G01N 23/2252 |
| | | | | 378/45 |
| 2009/0116613 | A1* | 5/2009 | Kataoka | G01N 23/223 |
| | | | | 378/47 |
| 2018/0243800 | A1 | 8/2018 | Kumar et al. | |
| 2020/0225173 | A1 | 7/2020 | Sato et al. | |
| 2020/0294760 | A1 | 9/2020 | Wang et al. | |
| 2020/0411140 | A1* | 12/2020 | Pappas | G16C 20/30 |
| 2021/0248417 | A1* | 8/2021 | Taya | G06F 18/214 |

FOREIGN PATENT DOCUMENTS

| | | |
|---|---|---|
| CN | 109884104 A | 6/2019 |
| JP | S47-051839 B | 12/1972 |
| JP | H10111261 A | 4/1998 |
| JP | 2001-027621 A | 1/2001 |
| JP | 2002357571 A | 12/2002 |
| JP | 2003075376 A | 3/2003 |
| JP | 2006058015 A | 3/2006 |
| JP | 2009-047586 A | 3/2009 |
| JP | 2014-228307 A | 12/2014 |
| WO | 2019064868 A1 | 4/2019 |

OTHER PUBLICATIONS

Office Action for corresponding Japanese patent application No. JP 2019-201388 dated Nov. 29, 2022.

Notice of First Examination Opinion dated Jan. 20, 2024 for the corresponding Chinese patent application No. 202011061191.4.

* cited by examiner

FIG.3

| ELEMENT | INPUT WAVELENGTH RANGE(nm) | PEAK OF INTEREST |
|---|---|---|
| Fe | 1.69~1.81 | $L\alpha, L\beta$ |
| Si | 0.705~0.710 | $sK\alpha 3, sK\alpha 4$ |
| Al | 0.825~0.832 | $sK\alpha 3, sK\alpha 4$ |
| ⋮ | ⋮ | ⋮ |

FIG.13

| CHEMICAL COMPOUNDS | CLASSIFICATION RESULT(%) |
|---|---|
| Fe | 0 |
| FeO | 0 |
| $Fe_2O_3$ | 9.4 |
| $Fe_3O_4$ | 90.6 |
| $FeS_2$ | 0 |

SAMPLE COMPONENT DETERMINATION METHOD, SAMPLE COMPONENT DETERMINATION APPARATUS, LEARNING METHOD AND COMPUTER READABLE NON-TRANSITORY RECORDING MEDIUM

BACKGROUND OF THE INVENTION

Field of the Invention

The present invention relates to a sample component determination method, a sample component determination apparatus, a learning method, and a computer readable non-transitory recording medium.

Description of the Background Art

In an X-ray analyzer such as an electron probe micro analyzer (EPMA), it is known that a chemical bonding state of an element in a sample may be determined by using a characteristic X-ray spectrum emitted from the sample.

In determining the chemical bonding state of a target element to be analyzed by using the characteristic X-ray spectrum, the phenomenon is utilized that the wave form such as the peak wavelength or the full width at half maximum (FWHM) of the peak and the intensity ratio between plural characteristic X-ray peaks will be different if the chemical bonding state is different. In other words, the chemical bonding state of a target element is determined by comparing the above parameters with the spectrum waveform of a chemical compound with a known composition and the spectrum waveform of the sample to be analyzed. This technique is generally referred to as "state analysis".

For example, Japanese Patent Laying-Open No. 2003-75376 discloses a technique for analyzing the chemical bonding state of tungsten based on the Mα line and the MP line of tungsten. Japanese Patent Laying-Open No. 2014-228307 discloses a technique for analyzing the chemical bonding state of aluminum based on the intensity of the Kα line and the sKα line of oxygen as well as full width at half maximum of the Kβ line of aluminum.

SUMMARY OF THE INVENTION

When the state analysis is performed by analyzing the spectrum waveform, the following process is generally executed. First is to determine the baseline and subtract the baseline from the spectrum waveform of an analysis target, and then determine the peak wavelength, the peak intensity and the full width at half maximum. The same is performed on the sample having a known composition. Next, the two spectrum waveforms are overlaid and displayed in graph, the shapes of the two waveforms and the above parameters (the peak wavelength, the peak intensity and the FWHM) are compared. When there are a plurality of peaks, their intensity ratios are also compared.

However, it is cumbersome for the user to perform the process described above. In addition, the parameters to be selected depend on the element to be analyzed and the compound that contains the element, and the selection of parameters requires analytical knowledge and experiences and is not easy for a user. Furthermore, the user may not keep all the samples having the known composition.

The present invention has been accomplished in view of the aforementioned problems, and an object of the present invention is to provide a technique capable of simply and easily determining a chemical bonding state of a target element to be analyzed in a sample by performing a state analysis on the sample using a spectrum which is measured by an X-ray analyzer.

A sample component determination method according to an aspect of the present invention includes: acquiring a spectrum of a sample which is measured by a wavelength dispersive X-ray analyzer; defining a target element to be analyzed in the sample and an input wavelength range corresponding to the target element; and determining a chemical bonding state of the target element in the sample by inputting a partial spectrum of the sample spectrum that falls within the input wavelength range to a first trained model.

A sample component determination apparatus according to an aspect of the present invention includes: a spectrum acquisition unit that acquires a spectrum of a sample which is measured by a wavelength dispersive X-ray analyzer, an input unit that defines a target element to be analyzed in the sample and an input wavelength range corresponding to the target element; a chemical compound determination unit that determines a chemical bonding state of the target element in the sample by inputting a partial spectrum of the sample spectrum that falls within the input wavelength range to a first trained model; and a display unit that displays the determined chemical bonding state.

A computer readable non-transitory recording medium according to an aspect of the present invention stores a sample component determination program to be executed by a computer. The sample component determination program causes the computer to perform an operation of acquiring a spectrum of a sample which is measured by a wavelength dispersive X-ray analyzer, an operation of defining a target element to be analyzed in the sample and an input wavelength range corresponding to the target element, and an operation of determining a chemical bonding state of the target element in the sample by inputting a partial spectrum of the sample spectrum that falls within the input wavelength range to a first trained model.

A learning method according to an aspect of the present invention is a learning method for creating the first trained model and the second trained model, and includes: creating the first trained model by a learning process using a pair of a spectrum of a chemical compound having a known composition and the composition of the chemical compound as training data; and creating the second trained model by a learning process using, as training data, a pair of a first spectrum that contains the high-order line peak and a shaped spectrum obtained by removing the high-order line peak from the first spectrum and a pair of a second spectrum that does not contain the high-order line peak and a shaped spectrum without removing the high-order line peak from the second spectrum.

A computer readable non-transitory recording medium according to an aspect of the present invention stores a training program to be executed by a computer. The training program is a training program for creating the first trained model and the second trained model, and the training program causes the computer to perform: an operation of creating the first trained model by a learning process using a pair of a spectrum of a chemical compound having a known composition and the composition of the chemical compound as training data; and an operation of creating the second trained model by a learning process using, as training data, a pair of a first spectrum that contains the high-order line peak and a shaped spectrum obtained by removing the high-order line peak from the first spectrum and a pair of a second spectrum that does not contain the high-order line peak and a shaped spectrum without removing the high-order line peak from the second spectrum.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a table illustrating an example of a relationship between elements and input wavelength ranges;

FIG. 13 is a diagram illustrating an example of a classification result to be displayed on a display unit;

DESCRIPTION OF THE PREFERRED EMBODIMENTS

Figure 1:
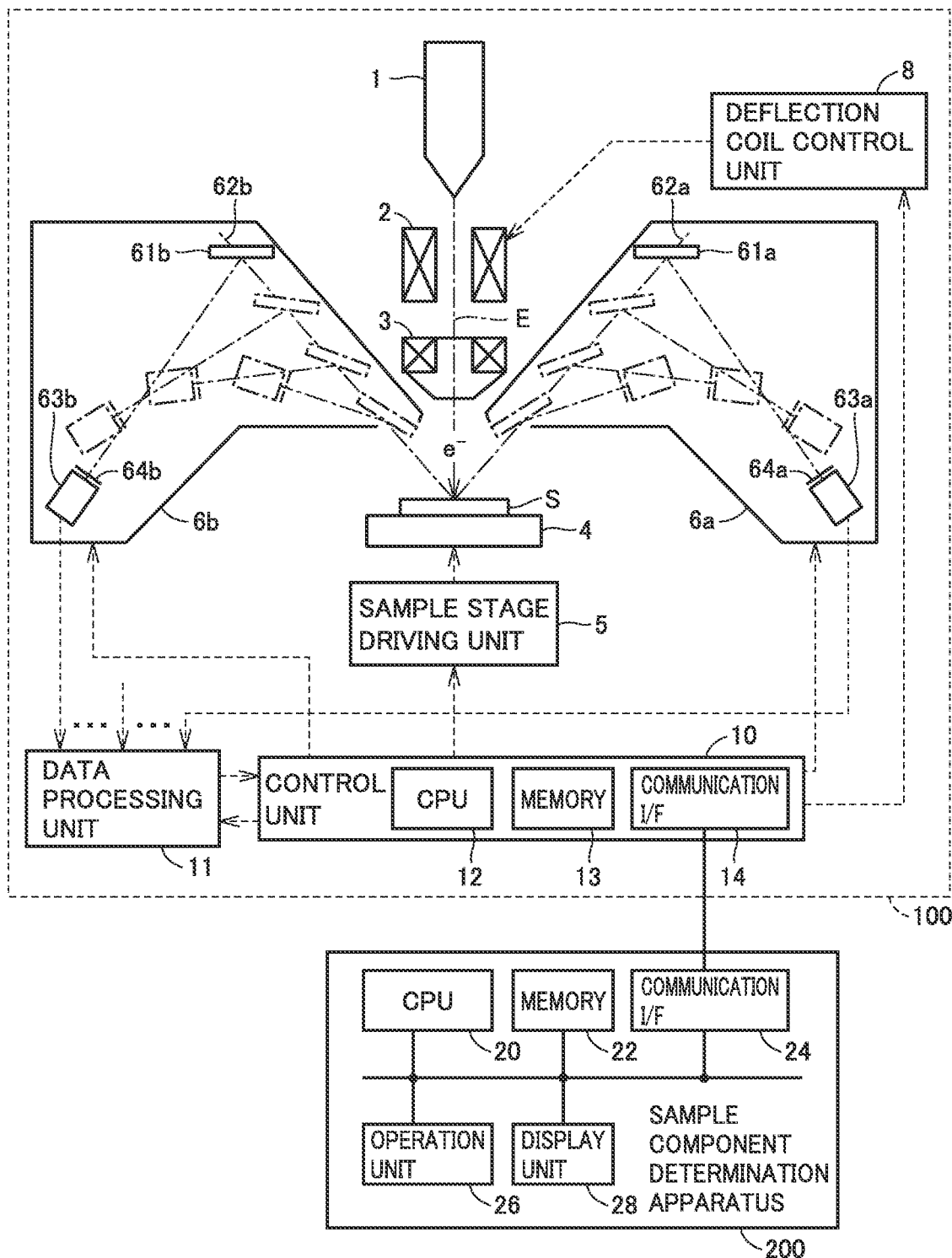
FIG. 1 is a diagram illustrating an overall configuration of an analysis system including a sample component determination apparatus according to the present embodiment.

Hereinafter, embodiments of the present invention will be described in detail with reference to the drawings. It should be noted that in the drawings, the same or corresponding portions are denoted by the same reference numerals, and the description thereof will not be repeated.

<Configuration of Analysis System>

FIG. 1 is a diagram illustrating an overall configuration of an analysis system including a sample component determination apparatus according to the present embodiment. The sample component determining apparatus according to the present embodiment is an apparatus for performing a state analysis on a sample, and is configured to determine a chemical bonding state of a target element to be analyzed in the sample using a characteristic X-ray spectrum of the sample which is measured by an X-ray analyzer.

<Configuration of X-Ray Analyzer>

The X-ray analyzer is equipped with a wavelength dispersive spectrometer (WDS), and may be, for example, an electron probe micro analyzer (EPMA) that irradiates an electron beam on a sample. Note that the X-ray analyzer is not limited to the EPMA, and may be a fluorescent X-ray analyzer that irradiates X-rays on a sample and analyzes characteristic X-rays by using the WDS.

With reference to FIG. 1, EPMA 100 includes an electron gun 1, a deflection coil 2, an objective lens 3, a sample stage 4, a sample stage driving unit 5, and a plurality of spectrometers 6a and 6b. The EPMA 100 further includes a control unit 10, a data processing unit 11, and a deflection coil control unit 8. The electron gun 1, the deflection coil 2, the objective lens 3, the sample stage 4, and the spectroscopes 6a and 6b are provided in a measurement chamber (not shown), and during the measurement with X-rays, the measurement chamber is evacuated to a vacuum state.

The electron gun 1 is an excitation source that generates an electron beam E to be irradiated on a sample S mounted on the sample stage 4. The beam current of the electron beam E may be adjusted by controlling a condenser lens (not shown). The deflection coil 2 forms a magnetic field when energized by a driving current supplied from the deflection coil control unit 8. The electron beam E may be deflected by the magnetic field formed by the deflection coil 2.

The objective lens 3 is disposed between the deflection coil 2 and the sample S mounted on the sample stage 4, and is configured to narrow the electron beam E that has passed through the deflection coil 2 to a small diameter. The electron gun 1, the deflection coil 2 and the objective lens 3 constitute an irradiation device that irradiates an electron beam on a sample. The sample stage 4 is a stage on which the sample S is mounted, and may be moved in a vertical direction and/or a horizontal direction by the sample stage driving unit 5.

By driving the sample stage 4 with the sample stage driving unit 5 and/or controlling the deflection coil 2 with the deflection coil control unit 8, it is possible to scan the sample S in two dimensions with the electron beam E. If the scanning range is relatively narrow, the scanning may be performed by controlling the deflection coil 2, and if the scanning range is relatively wide, the scanning may be performed by moving the sample stage 4.

The spectrometers 6a and 6b are devices for detecting characteristic X-rays emitted from the sample S irradiated by the electron beam E. Although two spectrometers 6a and 6b are illustrated in the example of FIG. 1, the number of spectrometers is not limited thereto, and it may be one or it may be three or more. The configuration of each spectrometer is the same except for the analyzing crystal, and hereinafter, each spectrometer may be simply referred to as the spectrometer 6.

The spectrometer 6a includes a analyzing crystal 61a, a detector 63a, and a slit 64a. The irradiation position of the electron beam E on the sample S, the analyzing crystal 61a and the detector 63a are located on a Rowland circle (not shown). When the analyzing crystal 61a is inclined and moved along a straight line 62a by a driving mechanism (not shown), the detector 63a is rotated in response to the movement of the analyzing crystal 61a as illustrated in the figure so that the incident angle of the characteristic X-rays into the analyzing crystal 61a and the emission angle of the diffracted X-rays from the analyzing crystal 61a satisfy the Bragg diffraction condition, which makes it possible to scan the wavelength of the characteristic X-rays emitted from the sample S.

The spectrometer 6b includes a analyzing crystal 61b, a detector 63a, and a slit 64b. The configuration of the spectrometer 6b is the same as that of the spectrometer 6a except for the analyzing crystal, and therefore, the description thereof will not be repeated. The configuration of each spectroscope is not limited to that described above, and various known configurations may be employed.

The control unit 10 includes a CPU (Central Processing Unit) 12, a memory 13, and a communication interface (I/F) 24. The memory 13 includes a ROM (Read Only Memory) and a RAM (Random Access Memory) (both not shown). The CPU 12 loads a program stored in the ROM to the RAM or the like and executes the program. The program stored in the ROM is a program that contains a processing procedure to be executed by the control unit 10. The ROM also stores various tables (maps) to be used in various calculations. The control unit 10 executes various processes in the EPMA 100 in accordance with the program and the tables. The processes are not limited to be executed by software, but may be executed by a dedicated hardware (electronic circuit). The software may be stored in advance in a flash memory (not shown). The software may be stored in a non-transitory recording medium and distributed as a program product.

The recording medium is not limited to a DVD-ROM, a CD-ROM, a FD (Flexible Disk) or a hard disk, and may be any medium that permanently carries a program such as a magnetic tape, a cassette tape, an optical disc (for example, MO (Magnetic Optical Disc), MD (Mini Disc) or DVD (Digital Versatile Disc)), an optical card, a mask ROM, an EPROM (Electronically Programmable Read-Only Memory), an EEPROM (Electronically Erasable Programmable Read-Only Memory), or a semiconductor memory such as a flash ROM. The recording medium is a non-transitory medium on which the program or the like may be read by a computer.

The program herein includes not only a program that may be directly executed by a CPU, but also a program in source program format, a compressed program, an encrypted program or the like.

The software may be provided as a downloadable program product by an information provider connected to the Internet. Such software is read from the storage medium by an IC card reader/writer (not shown) or the other reading device or is downloaded via the communication I/F 14 and then temporarily stored in a flash memory. The software is read from the flash memory by the CPU 12 and stored in the flash memory in the form of an executable program. The CPU 12 executes the program.

The communication I/F 14 is connected to a communication network such as the Internet, and the EPMA 100 exchanges data with an external apparatus via the communication I/F 14. The external apparatus may be a sample component determination apparatus 200.

Although not shown, the data processing unit 11 also includes a CPU, a memory, and an input/output buffer. The data processing unit 11 generates a characteristic X-ray spectrum (hereinafter, also referred to as spectrum data) of the target element. The data processing unit 11 may be integrated with the control unit 10.

The deflection coil control unit 8 controls a driving current supplied to the deflection coil 2 in accordance with an instruction from the control unit 10. By controlling the driving current in accordance with the driving current in a predetermined pattern (magnitude and changing speed), it is possible to scan the sample S with the electron beam E at a desired scanning speed.

<Configuration of Sample Component Determination Apparatus>

(Hardware Configuration of Sample Component Determination Apparatus)

The sample component determination apparatus 200 includes a CPU 20, a memory 22, a communication I/F 24, an operation unit 26, and a display unit 28. The memory 22 includes a ROM and a RAM (not shown).

The CPU 20 loads a program stored in the ROM to the RAM or the like and executes the program. The program stored in the ROM includes a program (sample component determination program) that contains a processing procedure to be executed by the sample component determination apparatus 200. The ROM also stores various tables (maps) to be used in various calculations. The sample component determination apparatus 200 executes a process of determining the chemical bonding state of an element contained in the sample S using the characteristic X-ray spectrum (spectrum data) acquired by the EPMA 100 in accordance with the program and the tables. The determination process is not limited software, but may be executed by a dedicated hardware (electronic circuit).

The communication I/F 24 is connected to a communication network such as the Internet. The sample component determination apparatus 200 exchanges data with an external apparatus such as the EPMA 100 via the communication I/F 24.

The operation unit 26 is an input interface for the user to input various instructions to the sample component determination apparatus 200, and may be constructed by, for example, a mouse, a keyboard and the like. The display unit 28 is an output interface for providing various kinds of information to the user, and may be constructed by, for example, a display including a touch panel to be operated by the user. The operation unit 26 may be a touch panel.

(Functional Configuration of Sample Component Determination Apparatus)

Figure 2:
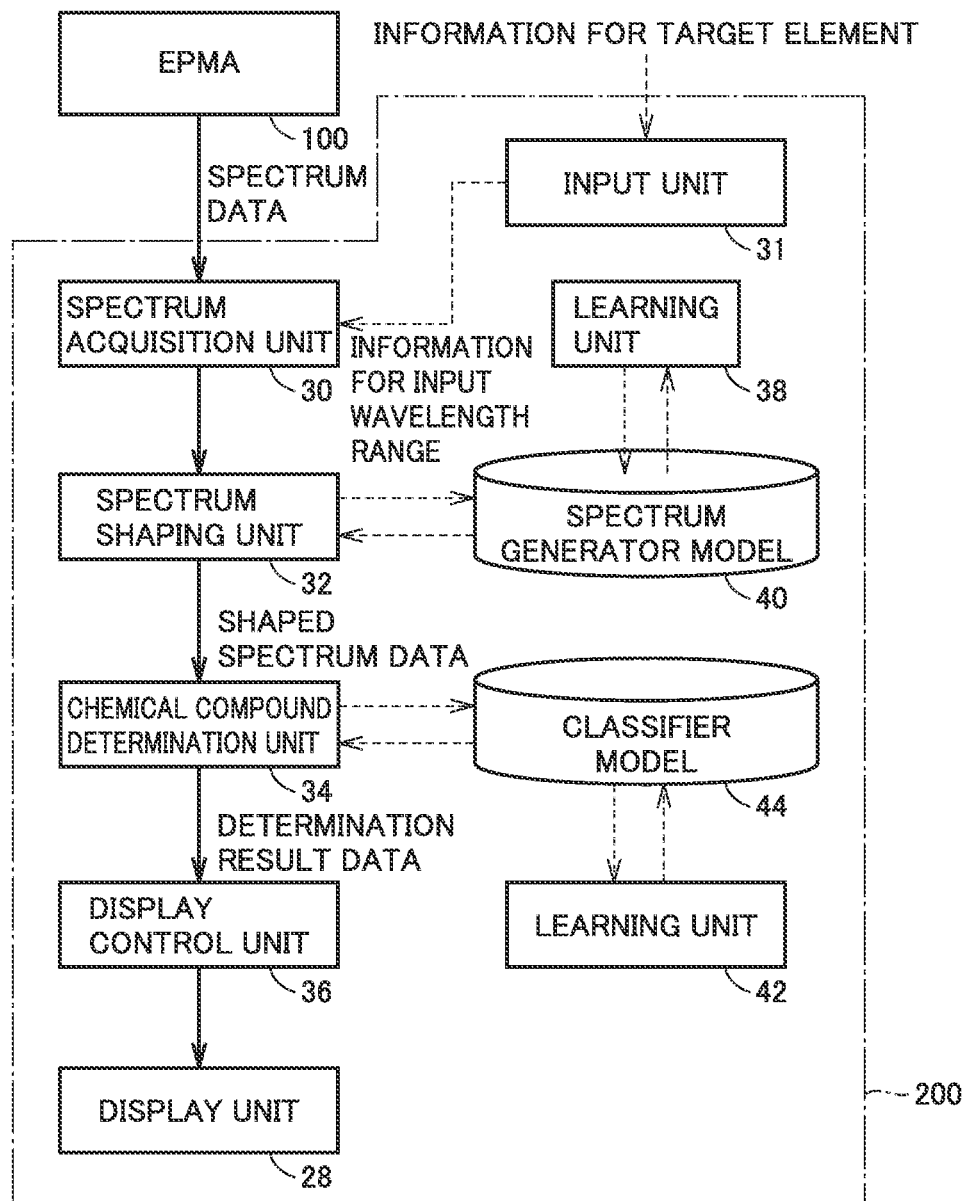
FIG. 2 is a block diagram illustrating an example of a functional configuration of a sample component determination apparatus.

FIG. 2 is a block diagram illustrating an example of a functional configuration of the sample component determination apparatus 200.

With reference to FIG. 2, the sample component determination apparatus 200 mainly includes an input unit 31, a spectrum acquisition unit 30, a spectrum shaping unit 32, a chemical compound determination unit 34, a display control unit 36, and a display unit 28. The sample component determination apparatus 200 further includes learning units 38 and 42, a spectrum generator model 40, and a classifier model 44. The function of each component may be implemented by, for example, the CPU 20 of the sample component determination apparatus 200 executing a program stored in the memory 22. The function of some or all components may be implemented by a hardware.

The input unit 31 receives information related to an element to be analyzed. Specifically, when the input unit 31 receives information indicating a target element designated by the user from the operation unit 26 (see FIG. 1), the input unit 31 defines an input wavelength range of the spectrum data in accordance with the designated target element. The "input wavelength range" corresponds to the wavelength range of the characteristic X-ray spectrum required for determining the chemical bonding state of the target element contained in the sample S. The input wavelength range differs for each target element. FIG. 3 is a table illustrating an example of a relationship between elements and input wavelength ranges. FIG. 3 illustrates the input wavelength ranges for iron (Fe), silicon (Si), and aluminum (Al).

FIG. 3 illustrates peaks for primary lines of interest to be used in determining the chemical bond state for each element. The input wavelength range is set to include the wavelength of the primary lines of interest. In the case of iron, the primary lines of interest are Lα line and Lβ line, and the input wavelength range is set to 1.69 to 1.81 nm. In the case of silicon, the primary lines of interest are sKα3 line and sKα4 line, and the input wavelength range is set to 0.705 to 0.710 nm. In the case of aluminum, the primary lines of interest are sKα3 line and sKα4 line, and the input wavelength range is set to 0.825 to 0.832 nm.

The sample component determination apparatus 200 may store a preset table illustrated in FIG. 3 in the memory 22 in advance. Thus, after the input unit 31 receives the target element information, the input unit 31 can define the input wavelength range corresponding to the target element by referring to the table illustrated in FIG. 3. The input unit 31 provides information indicating the defined input wavelength range to the spectrum acquisition unit 30.

The spectrum acquisition unit 30 receives the characteristic X-ray spectrum (spectrum data) of the sample S from the EPMA 100 via the communication/F 24 (see FIG. 1) and receives the information indicating the input wavelength range from the input unit 31. The spectrum data may be acquired from any destination. Thus, the spectrum acquisition unit 30 may be configured to acquire the spectrum data stored in an external storage device or a server (both not shown) installed on the Internet other than acquiring the spectrum data from the EPMA 100.

The spectrum acquisition unit 30 extracts and acquires a spectrum data within the input wavelength range from the spectrum data of the sample S. For example, if the target element to be analyzed is iron, the spectrum acquisition unit 30 acquires the spectrum data within a wavelength range of 1.69 to 1.81 nm. The spectrum acquisition unit 30 outputs the acquired spectrum data to the spectrum shaping unit 32.

The spectrum shaping unit 32 shapes the acquired spectrum data. More specifically, the spectrum shaping unit 32 removes a high-order line peak from the spectrum data using the spectrum generator model 40 to generate shaped spectrum data. A high-order line peak refers to a peak component of a high-order diffraction line (so-called high-order line) that is present in the characteristic X-ray spectrum within the input wavelength range. The spectrum shaping unit 32 outputs the generated shaped spectrum data to the chemical compound determination unit 34.

Figure 4:
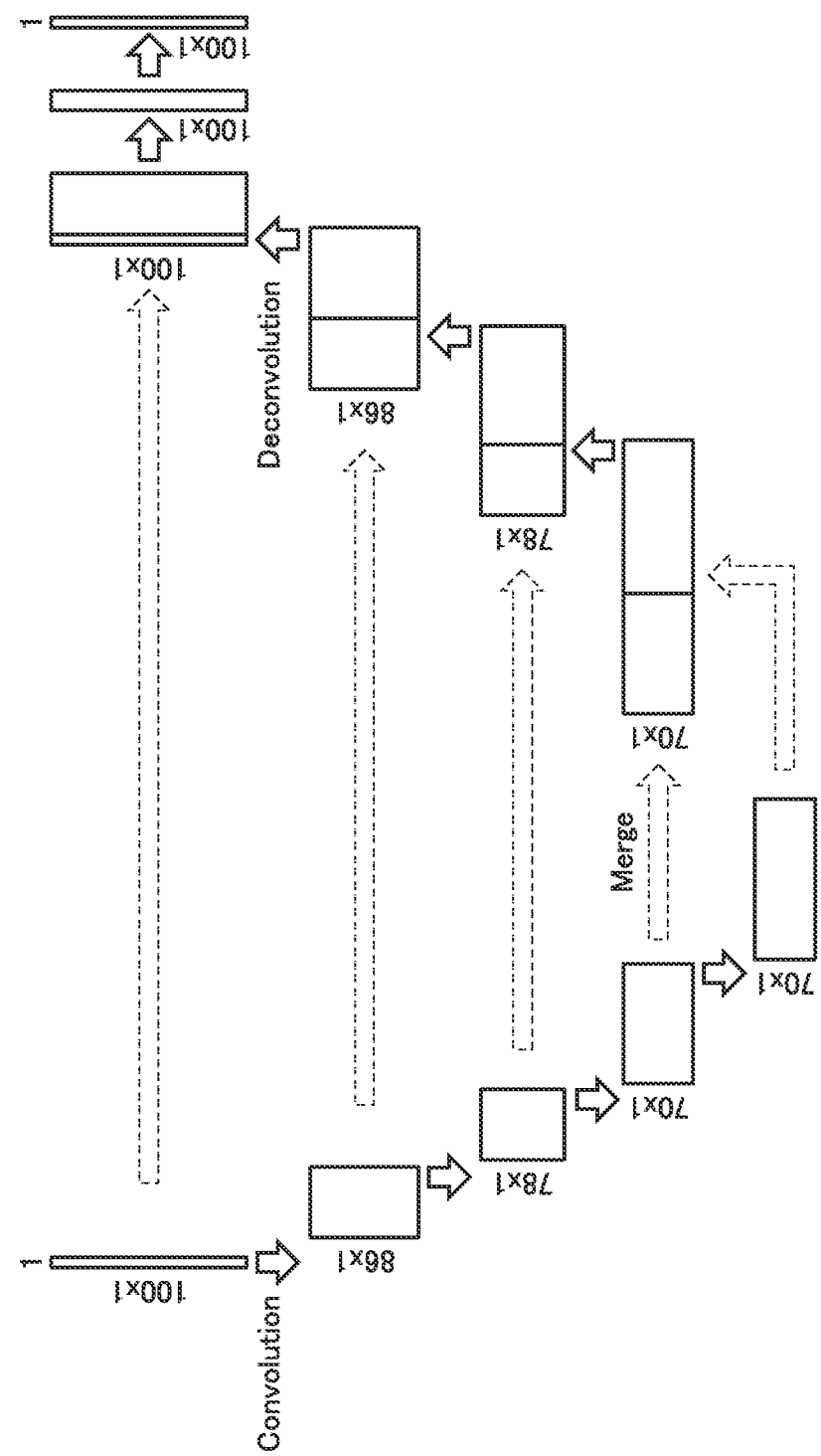
FIG. 4 is a diagram schematically illustrating an example of a spectrum generator model.

The spectrum generator model 40 is a model (trained model) trained by the learning unit 38 with a learning process. FIG. 4 is a diagram schematically illustrating an example of the spectrum generator model 40. As the spectrum generator model 40, for example, a U-shaped neural network (so-called U-NET) illustrated in FIG. 4 may be used.

The U-shaped neural network illustrated in FIG. 4 extracts a waveform feature from the input spectrum data in convolution layers along a downward path. Next, the spectrum data is restored to the original size in deconvolution layers along an upward path while maintaining the waveform feature. Further, the data in a hierarchical layer in the downward path may be merged sequentially from the deepest layer with the data in a hierarchical layer in the upward path which has the same data size as the hierarchical layer in the upward path, whereby the overall position information may be restored while maintaining the local waveform feature.

Referring back to FIG. 2, the chemical compound determination unit 34 analyzes the shaped spectrum data to determine that the sample S corresponds to which chemical compound in the chemical compounds containing the target element. Specifically, the chemical compound determination unit 34 determines a chemical compound corresponding to the sample S using the classifier model 44.

Figure 5:
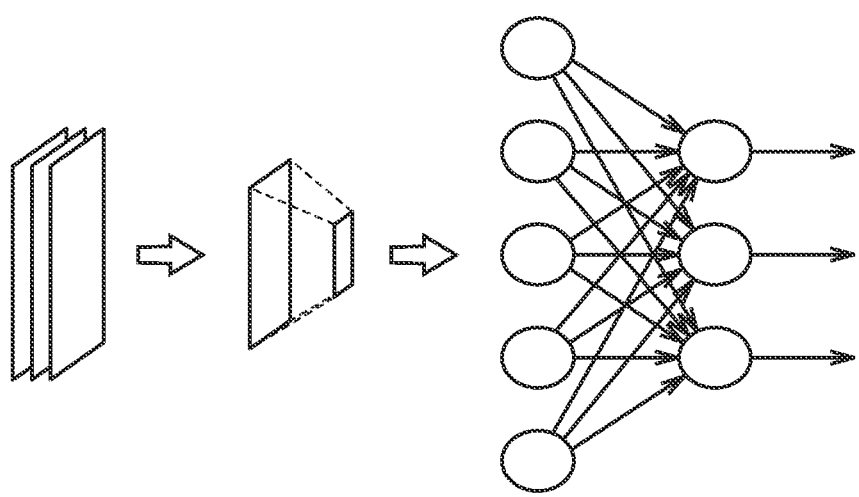
FIG. 5 is a diagram schematically illustrating an example of a classifier model.

The classifier model 44 is a model trained by the learning unit 42 with a learning process. FIG. 5 is a diagram schematically illustrating an example of the classifier model 44. A convolutional neural network (CNN) is typically used as the classifier model 44. The CNN is mainly composed of convolution layers, pooling layers, and full connected layers. A typical CNN has a structure in which the convolution layers and the pooling layers are alternately stacked and then stacked with a number of full connected layers.

The shaped spectrum data is input to the classifier model 44. The convolution layers and the pooling layers extract the waveform feature from the input shaped spectrum data. The full connected layers classify the chemical bonding state (in other words, the chemical compound) of the target element based on the extracted waveform feature, and outputs the classification result.

Generally, in a model such as CNN, a learning process is conducted in advance using training data. In the present embodiment, for example, the classifier model 44 may be trained using a pair of a spectrum data with an input wavelength range set in advance for each target element and a chemical compound corresponding to the spectrum data as training data. The learning process to be conducted on a model will be described later.

Referring back to FIG. 2, the chemical compound determination unit 34 inputs the shaped spectrum data to the classifier model 44, and obtains an arithmetic result which contains probabilities indicating the correspondence between the sample and each compound in the chemical compounds as an output from the classifier model 44. The chemical compound determination unit 34 outputs the arithmetic result containing the probabilities to the display control unit 36 as the classification result. The display control unit 36 displays the acquired classification result on the display unit 28.

(Functional Configuration of Learning Unit)

In the functional configuration illustrated in FIG. 2, the spectrum generator model 40 is a model trained the learning unit 38 with a learning process. In an embodiment, the spectrum generator model 40 corresponds to a "second trained model", and the learning unit 38 corresponds to a "second learning unit". The classifier model 44 is a model trained by the learning unit 42 with a learning process. In an embodiment, the classifier model 44 corresponds to a "first trained model", and the learning unit 42 corresponds to a "first learning unit". Hereinafter, the functional configuration of the learning unit 38 and the learning unit 42 will be described schematically with reference to FIGS. 6 to 8.

Figure 6:
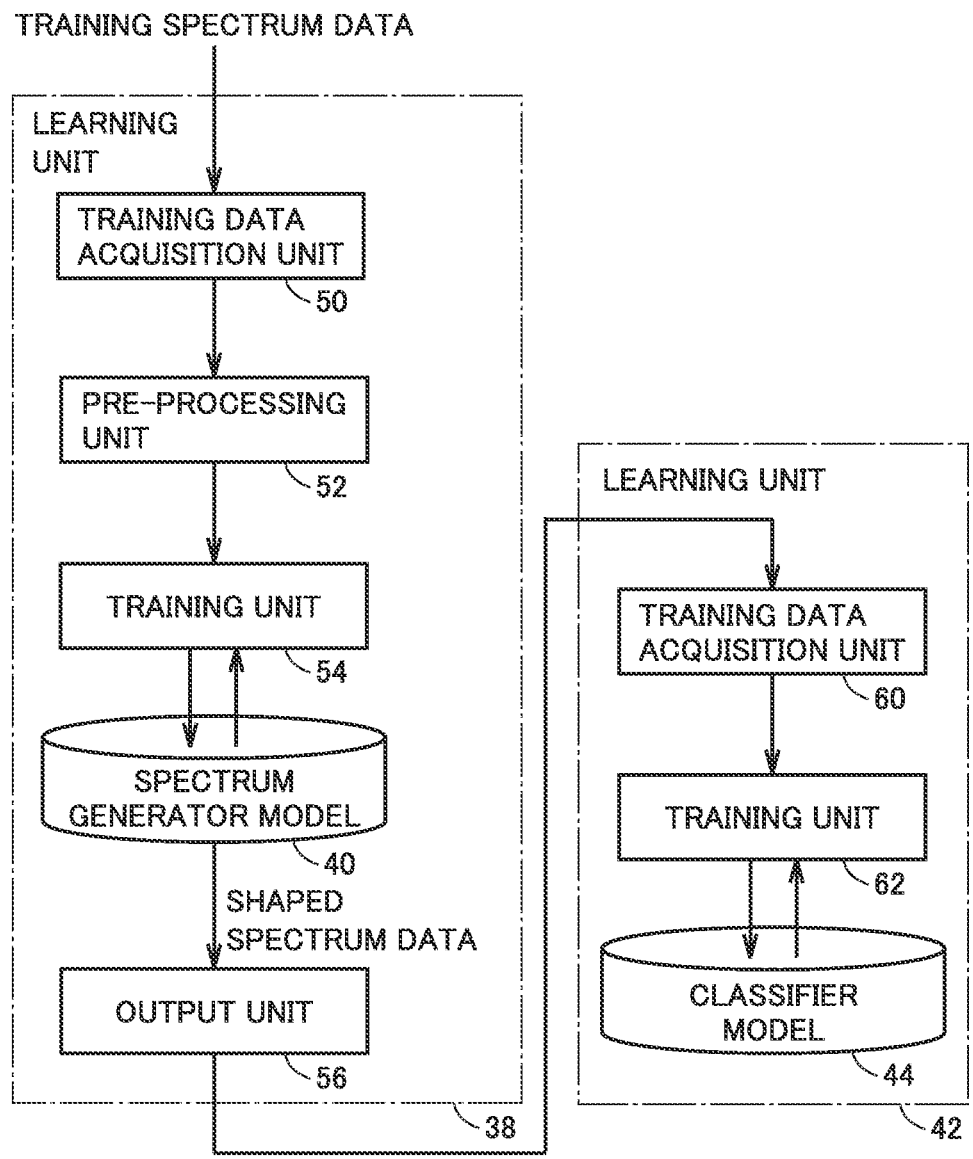
FIG. 6 is a block diagram illustrating an example of a functional configuration of a learning unit.

FIG. 6 is a block diagram illustrating an example of a functional configuration of the learning unit 38 and the learning unit 42.

With reference to FIG. 6, the learning unit 38 includes a training data acquisition unit 50, a pre-processing unit 52, a training unit 54, and an output unit 56. The function of each component may be implemented by, for example, the CPU 20 of the sample component determination apparatus 200 executing a program stored in the memory 22. The function of some or all components may be implemented by a hardware.

The training data acquisition unit 50 acquires a plurality of spectrum data for a chemical compounds containing the target element. The plurality of spectrum data contain a high-order line peak. The training data acquisition unit 50 acquires a partial spectrum data within the input wavelength range corresponding to the target element from each of the plurality of spectrum data as training spectrum data.

The pre-processing unit 52 removes the high-order line peak from the training spectrum data if it contains the high-order line peak. More specifically, the pre-processing unit 52 fits the high-order line peak with a standard waveform of Gauss function, Lorentz function or a composite function thereof. The pre-processing unit 52 subtracts the fitted waveform data from the original spectrum data so as to remove the high-order line peak from the shaped spectrum data.

The training data acquisition unit 50 may obtain a spectrum data that does not contain any high-order line peak by using a pulse height analyzer (PHA) to measure the input wavelength range.

Figure 7:
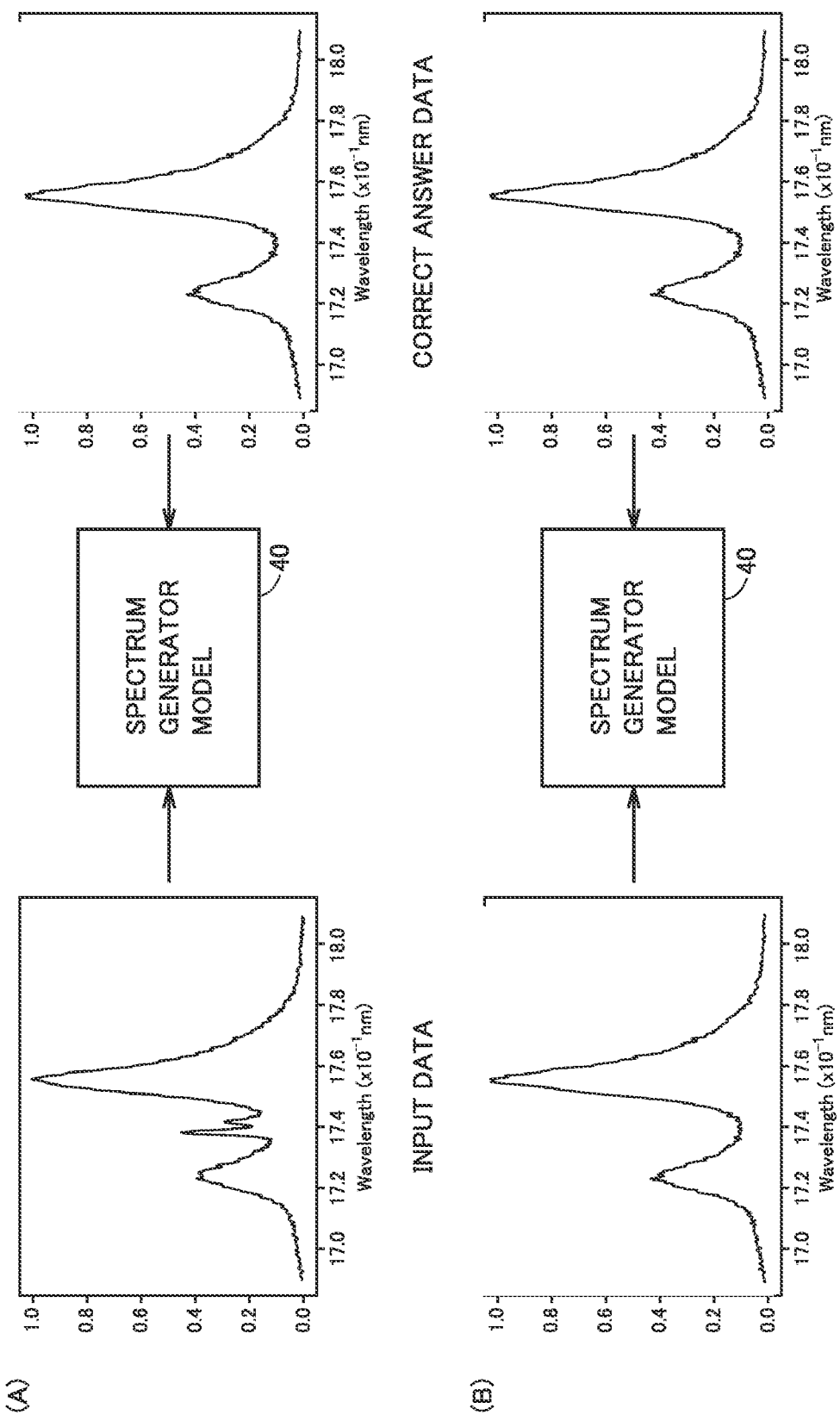
FIG. 7 is a diagram for explaining a learning process to be conducted by a training unit on a spectrum generator model.

The training unit 54 conducts a learning process on the spectrum generator model 40 using the spectrum data from which the high-order line peak has been removed by the pre-processing unit 52 and the spectrum data that does not contain any high-order line peak as correct answer data. FIG. 7 is a diagram for explaining a learning process to be conducted on the spectrum generator model 40 by the training unit 54.

As illustrated in FIG. 7, if the training spectrum data input to the spectrum generator model 40 contains a high-order line peak, the training unit 54 uses the training spectrum data as input data and uses the spectrum data which is obtained by removing the high-order line peak from the training spectrum data as correct answer data to train the spectrum generator model 40. On the other hand, if the training spectrum data input to the spectrum generator model 40 does not contain any high-order line peak, the training unit 54 uses the training spectrum data as input data and uses the training spectrum data itself as correct answer data to train the spectrum generator model 40. After the training spectrum data is inputted to the spectrum generator model 40, the training unit 54 obtains a deviation (loss) between an output data of the spectrum generator model 40 and the correct answer data, and optimizes the spectrum generator model 40 so as to minimize the deviation.

Thus, in the learning unit 38, a learning process is conducted on the spectrum generator model 40 using the training data so that the spectrum generator model 40 may generate the shaped spectrum data in which the high-order line peak has been removed from the inputted spectrum data. As illustrated in FIG. 7, the training data includes a pair of the spectrum data that contains the high-order line peak and the shaped spectrum data thereof and a pair of the spectrum data that does not contain the high-order line peak and the shaped spectrum data without removing the high-order line peak from the spectrum data.

Referring back to FIG. 6, the learning unit 42 includes a training data acquisition unit 60 and a training unit 62. The training data acquisition unit 60 acquires a plurality of spectrum data of a chemical compounds having a known composition. Each of the plurality of spectrum data is shaped spectrum data from which the high-order line peak has been removed. The training data acquisition unit 60 acquires a spectrum data within an input wavelength range corresponding to the target element from each of the plurality of spectrum data as training spectrum data.

Figure 8:
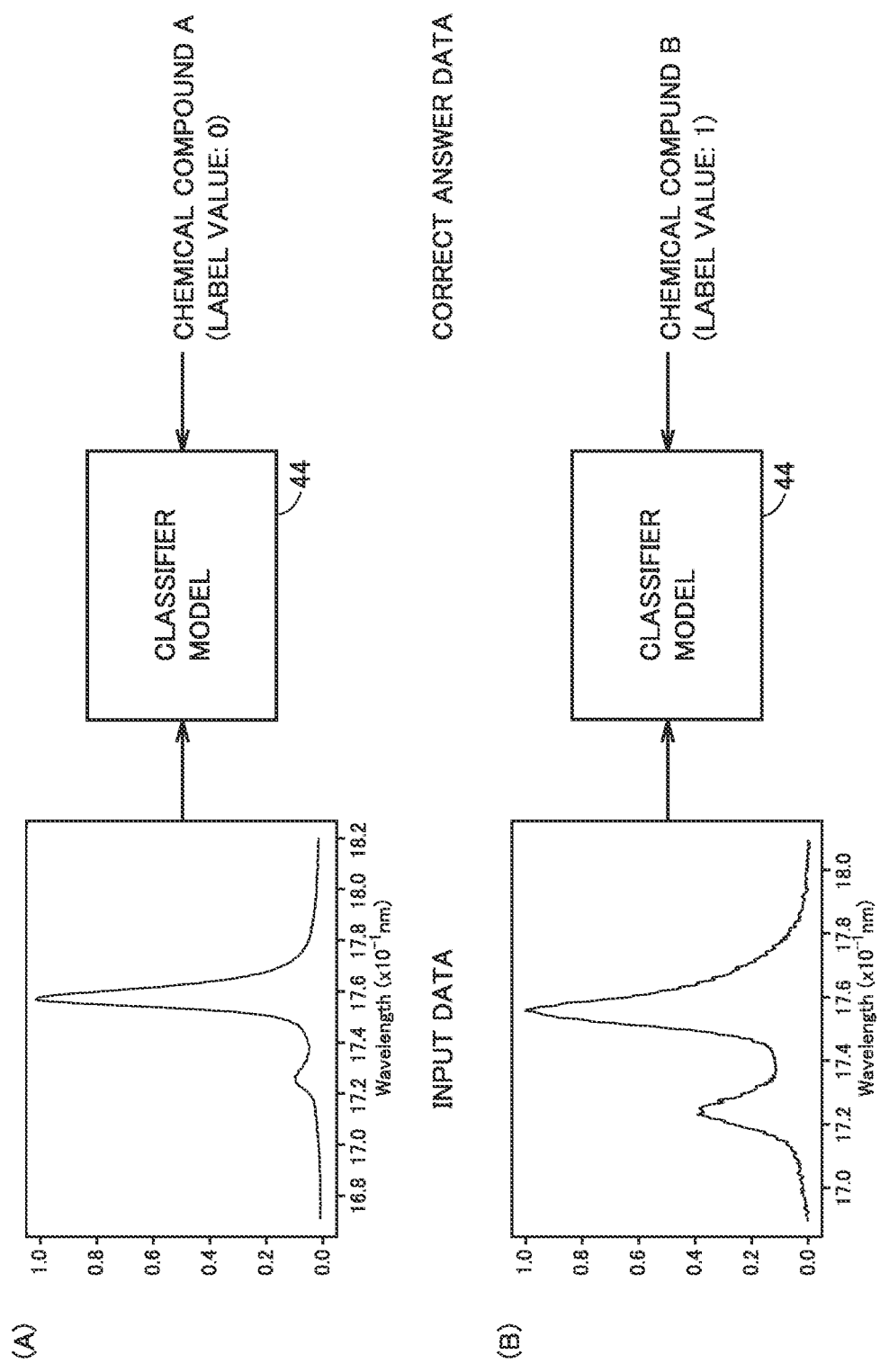
FIG. 8 is a diagram for explaining a learning process to be conducted by a training unit on a classifier model.

The training unit 62 conducts a learning process on the classifier model 44 using the training spectrum data. FIG. 8 is a diagram for explaining a learning process to be conducted by the training unit 62 on the classifier model 44. As illustrated in FIG. 8, the training unit 62 uses the acquired plurality of spectrum data as input data and uses the label value of a chemical compound corresponding to each of the plurality of spectrum data as correct answer data to train the classifier model 44. After the training spectrum data is inputted to the classifier model 44, the training unit 62 obtains a deviation (loss) between an output data of the classifier model 44 and the correct answer data, and optimizes the classifier model 44 so as to minimize the deviation.

Thus, in the learning unit 42, a learning process is conducted on the classifier model 44 using the training data so that the classifier model 44 can calculate probabilities indicating the correspondence between the sample and each compound in the chemical compounds from the inputted spectrum data. As illustrated in FIG. 8, the training data includes a pair of the spectrum data of a chemical compound having a known composition and the composition of the chemical compound.

EMBODIMENT

Hereinafter, an example of a sample component determination process using the sample component determination apparatus 200 according to the present embodiment will be described. In the present embodiment, iron is used as the target element, and the chemical bonding state of iron contained in the sample is determined. It is assumed that as the chemical bonding state of iron, a chemical compound that includes five kinds of chemical compounds such as iron (Fe), iron oxide (wustite (FeO), hematite ($Fe_2O_3$), magnetite ($Fe_3O_4$)), and iron sulfide ($FeS_2$) is determined.

Figure 9:
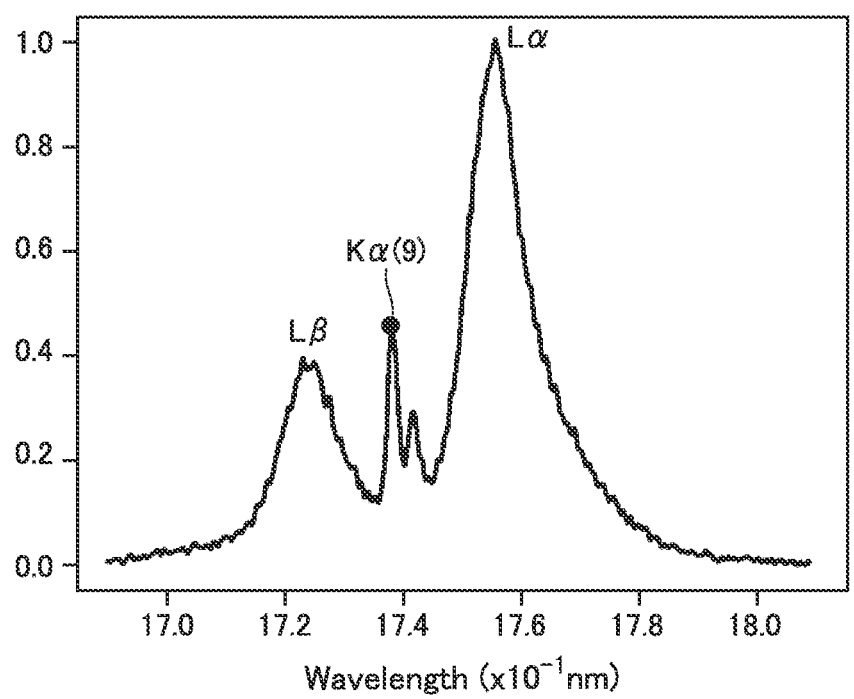
FIG. 9 is a diagram illustrating an example of a characteristic X-ray spectrum of a sample measured by EPMA.

FIG. 9 is a diagram illustrating an example of a characteristic X-ray spectrum of a sample measured by the EPMA 100. In FIG. 9, the horizontal axis represents the wavelength of the characteristic X-ray spectrum, and the vertical axis represents the signal intensity of the characteristic X-ray spectrum. The characteristic X-ray spectrum illustrated in FIG. 9 is in a wavelength range of 1.69 to 1.81 nm. The characteristic X-ray spectrum includes a primary line composed of an $L\alpha$ line and an $L\beta$ line.

As illustrated in FIG. 9, a high-order diffraction line (high-order line) of $K\alpha$ line appears between the $L\alpha$ line and the $L\beta$ line. Since the high-order line of $K\alpha$ line is positioned close to the $L\alpha$ line and the $L\beta$ line, it is unfavorable in evaluating the waveform of the primary line. Therefore, it is necessary to remove the high-order line of $K\alpha$ line from the characteristic X-ray spectrum.

Figure 10:
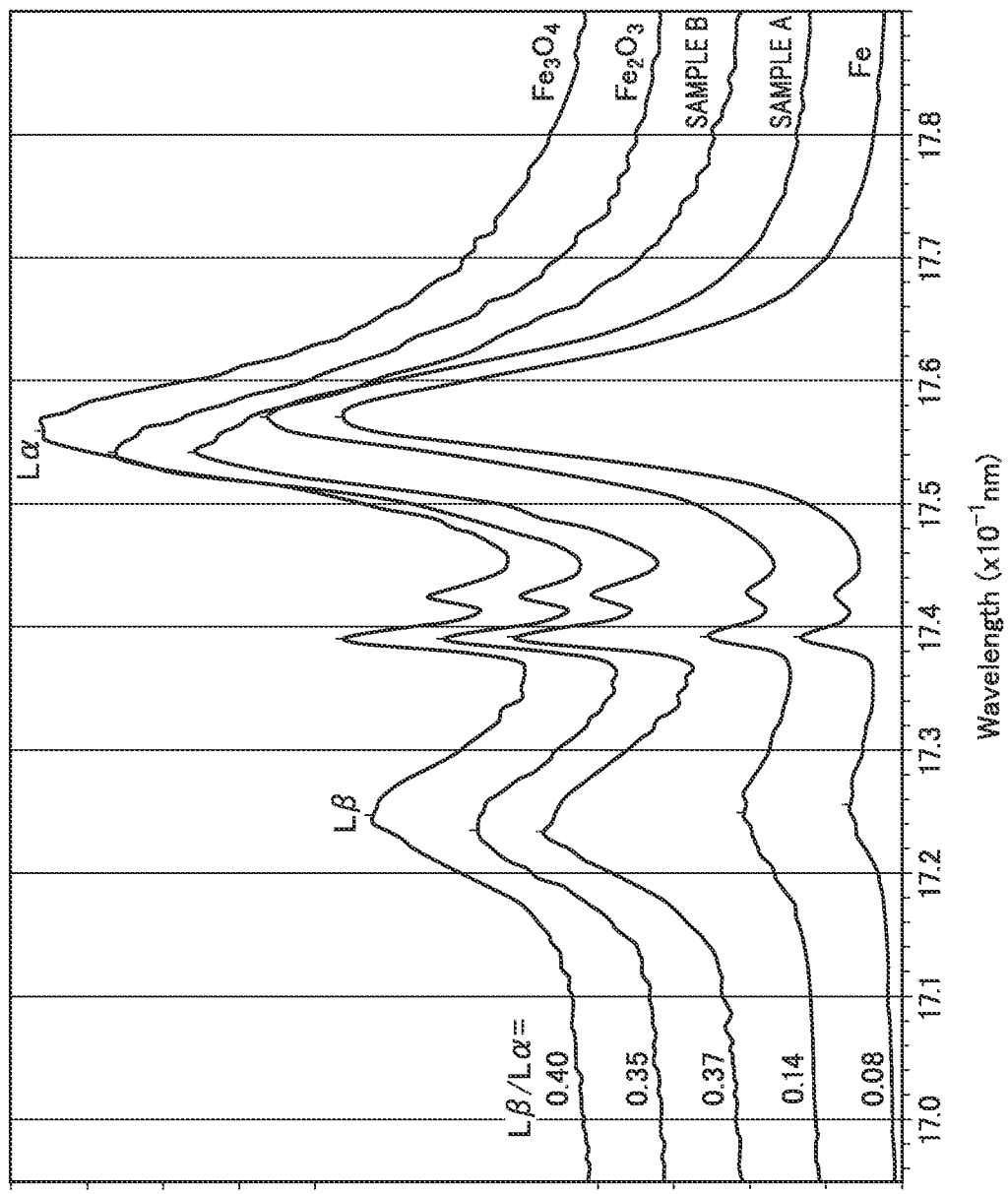
FIG. 10 is a diagram illustrating an example of a characteristic X-ray spectrum emitted from a chemical compound of iron.

FIG. 10 is a diagram illustrating an example of a characteristic X-ray spectrum emitted from a chemical compound of iron. Similar to FIG. 9, the characteristic X-ray spectrum illustrated in FIG. 10 is in a wavelength range of 1.69 to 1.81 nm.

FIG. 10 shows the spectra of iron (Fe), magnetite ($Fe_3O_4$), and hematite ($Fe_2O_3$). By comparing these spectra, it is obvious that the wave form such as the peak wavelength or the FWHM and the peak intensity of the spectrum are different if the chemical bonding state of iron is different.

In FIG. 10 illustrates that the characteristic X-ray spectra of two kinds of samples (sample A and sample B) are overlaid on the characteristic X-ray spectra of the chemical compounds having a known composition. In order to determine the chemical bonding state of each sample using the characteristic X-ray spectrum, the difference in the wave form and the peak intensity due to the different chemical bonding state described above is used. In other words, by comparing these parameters between the characteristic X-ray spectrum of a chemical compound having a known composition and the characteristic X-ray spectrum of a sample, the chemical bonding state of iron contained in each sample may be determined. This method is generally referred to as "state analysis".

The sample component determination process according to the present embodiment includes a process of training models (the spectrum generator model 40 and the classifier model 44) using the characteristic X-ray spectra of a chemical compound having known compositions, and a process of determining the chemical bonding state of iron in the sample S using the trained model. Hereinafter, the procedure of each process will be described with reference to FIGS. 11 and 12.

(Model Learning Process)

Figure 11:
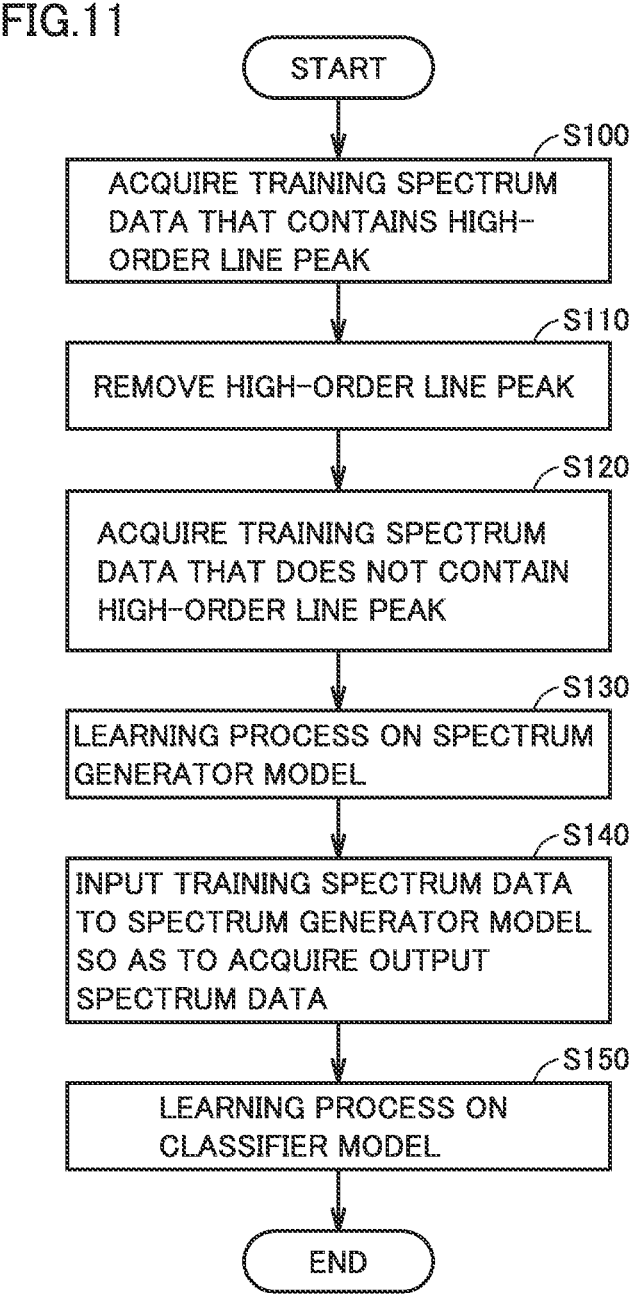
FIG. 11 is a flowchart for explaining a model learning process according to the present embodiment.

FIG. 11 is a flowchart for explaining a model learning process according to the present embodiment. The flowchart of FIG. 11 is mainly executed by the learning unit 38 and the learning unit 42 (see FIG. 2).

With reference to FIG. 11, the learning unit 38 acquires the spectrum data of a chemical compound containing a target element (iron) as training spectrum data in step S100. The learning unit 38 acquires apart of the spectrum data within the input wavelength range (1.69 to 1.81 nm) associated with the target element (iron). The acquired spectrum data includes an Lα line peak and an Lβ line peak (see FIG. 9). Further, the spectrum data includes a high-order Kα line peak.

In step S110, the learning unit 38 removes the high-order line peak from the acquired training spectrum data. In step S110, the learning unit 38 fits the wavelength range corresponding to the high-order Kα line peak in the spectrum data with a standard waveform of Gauss function, Lorentz function, or a composite function thereof. The learning unit 38 removes the high-order Kα line peak by subtracting the fitted waveform data from the original spectrum data.

Further, in step S120, the learning unit 38 acquires a plurality of spectrum data containing no high-order line peak as training spectrum data. In step S120, the learning unit 38 acquires a plurality of spectrum data containing no high-order line peak for the chemical compounds by discriminating the energy of the X-ray signals using a pulse height analyzer (PHA).

After the training spectrum data from which the high-order line peak has been removed and the training spectrum data that does not contain the high-order line peak have been acquired in steps of S100 to S120, the learning unit 38 proceeds to step S130, and conducts a learning process on the spectrum generator model 40 using the training spectrum data. In step S130, the learning unit 38 sets the plurality of spectrum data from which the high-order line peak has been removed in step S120 as the correct answer data for the plurality of spectrum data acquired in step S100, and sets the plurality of spectrum data does not contain the high-order line peak as the correct answer data for the plurality of spectrum data acquired in step S120. The learning unit 38 conducts a learning process on the spectrum generator model 40 using the correct answer data.

Next, the learning unit 38 inputs the plurality of spectrum data (in other words, the spectrum data that contains the high-order line peak) acquired in step S100 to the trained spectrum generator model 40, and accordingly acquires a plurality of shaped spectrum data from which the high-order line peak has been removed from the spectrum generator model 40. The learning unit 38 outputs the plurality of shaped spectrum data obtained as an output from the spectrum generator model 40 to the learning unit 42.

The learning unit 42 acquires the plurality of shaped spectrum data as training data. In step S150, the learning unit 42 conducts a learning process on the classifier model 44 using the label values of the chemical compound corresponding respectively to the plurality of acquired shaped spectrum data as the correct answer data. Thus, the trained classifier model 44 is available.

(Determination Process of Chemical Bonding State)

Figure 12:
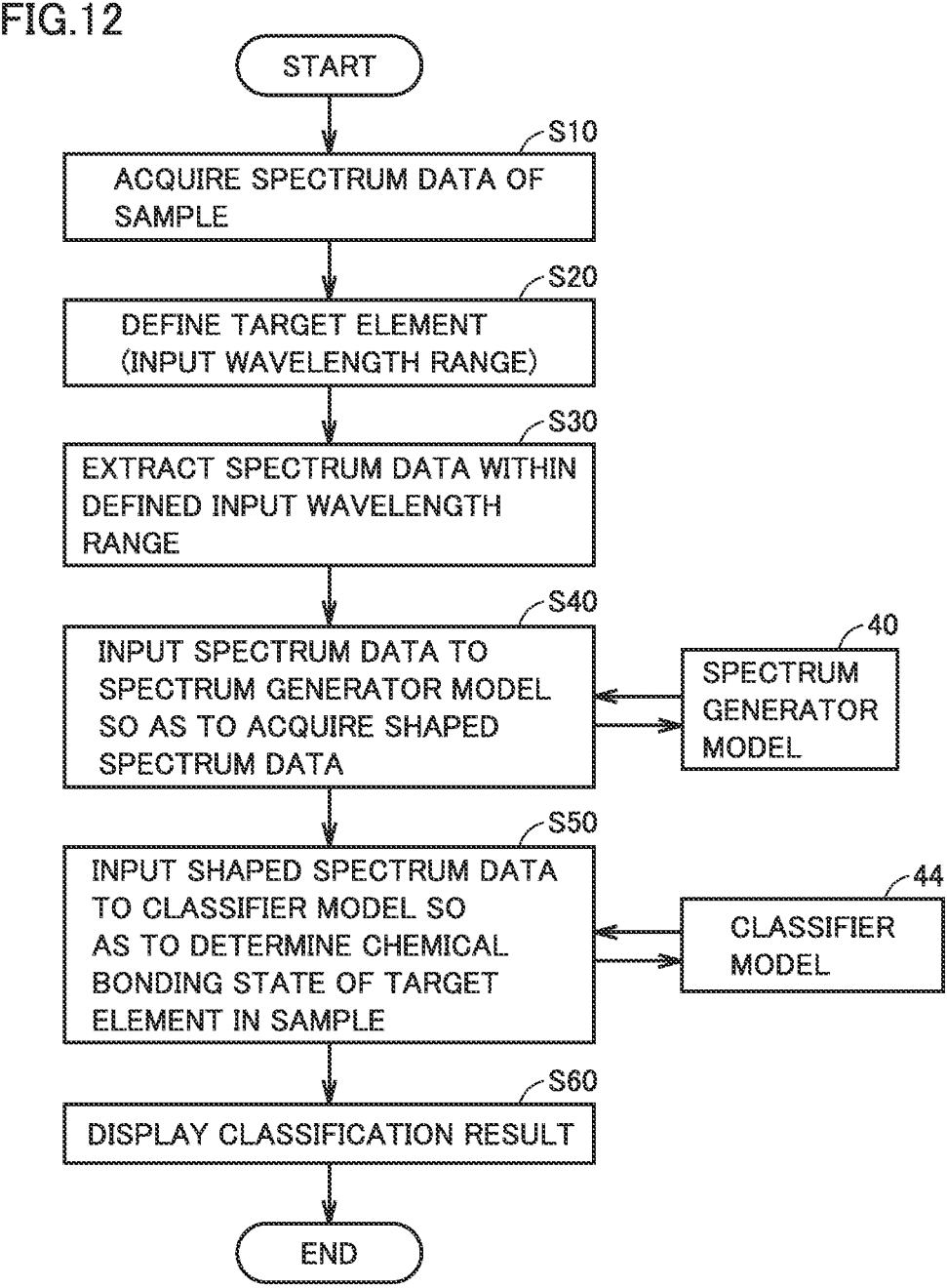
FIG. 12 is a flowchart for explaining a process of determining the chemical bonding state of a target element in the sample according to the present embodiment.

FIG. 12 is a flowchart for explaining a process of determining the chemical bonding state of a target element in the sample S according to the present embodiment. The process of FIG. 12 is executed by the spectrum acquisition unit 30, the spectrum shaping unit 32, the chemical compound determination unit 34, and the display control unit 36 (see FIG. 2).

With reference to FIG. 12, in step S10, the spectrum acquisition unit 30 acquires the spectrum data of the sample S from EPMA 100 (or an external storage device).

In step S20, the input unit 31 defines the input wavelength range for the spectrum data in accordance with the target element designated by the user with reference to the table of FIG. 3. The input unit 31 provides information indicating the defined input wavelength range to the spectrum acquisition unit 30.

In step S30, the spectrum acquisition unit 30 extracts and acquires spectrum data within the input wavelength range (1.69 to 1.81 nm) corresponding to the target element (iron) from the spectrum data of the sample S. The spectrum acquisition unit 30 outputs the acquired spectrum data to the spectrum shaping unit 32.

In step S40, the spectrum shaping unit 32 inputs the acquired spectrum data of the sample S to the spectrum generator model 40. The spectrum shaping unit 32 acquires the shaped spectrum data as an output from the spectrum generator model 40. The spectrum shaping unit 32 outputs the acquired shaped spectrum data to the chemical compound determination unit 34.

In step S50, the chemical compound determination unit 34 inputs the obtained shaped spectrum data to the classifier model 44. The chemical compound determination unit 34 acquires the arithmetic result which contains probabilities indicating the correspondence between the sample and each chemical compound as an output from the classifier model 44. The chemical compound determination unit 34 outputs the arithmetic result containing the probabilities to the display control unit 36 as the classification result.

In step S60, the display control unit 36 displays the acquired classification result on the display unit 28. FIG. 13 is a diagram illustrating an example of a classification result displayed on the display unit 28. As illustrated in FIG. 13, the probabilities indicating the correspondence relation between the sample S and each chemical compound is illustrated in the display unit 28 as a table. The table lists the probability for each chemical compound. In the example of FIG. 13, the probability of magnetite ($Fe_3O_4$) is the highest among the probabilities of five kinds of iron chemical compound. Therefore, the user may determine that it is highly possible that the sample S is magnetite ($Fe_3O_4$).

As described above, according to the sample component determination apparatus according to the present embodiment, since the user does not need to set complicated analysis conditions and analyze the spectrum waveform, it is possible to simply and easily determine the chemical bonding state of a target element in the sample.

Other Example Configuration

Hereinafter, another example configuration of the sample component determination apparatus and the analysis system according to the present embodiment will be described.

Figure 14:
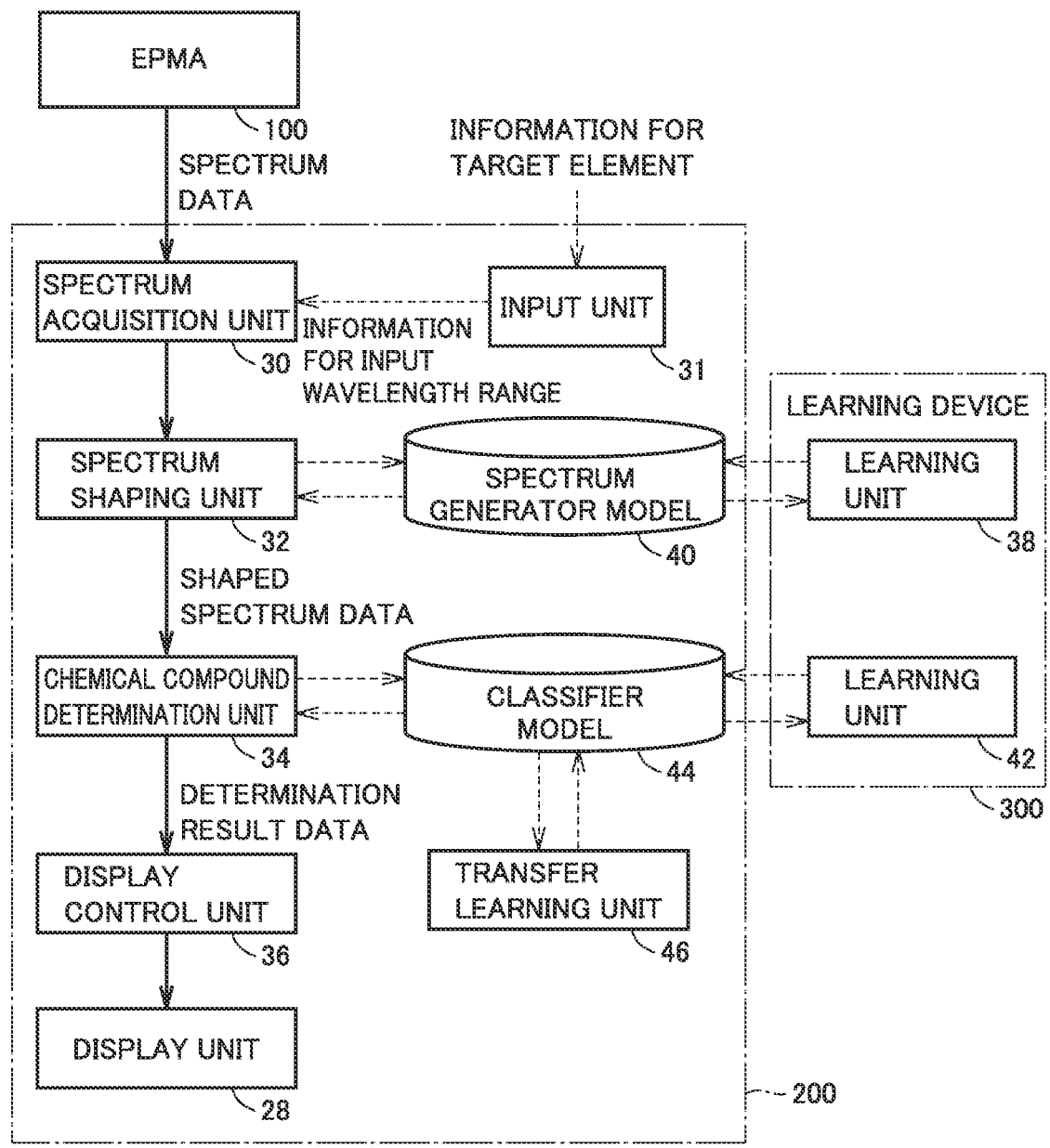
FIG. 14 is a diagram illustrating an overall configuration of a first modification of the analysis system according to the present embodiment.

(1) In the embodiment described above, it is described that the sample component determination apparatus 200 includes the learning units 38 and 42 for conducting a learning process on the spectrum generator model 40 and the classifier model 44, but as illustrated in FIG. 14, the learning process may be conducted by a learning device 300 separated from the sample component determination apparatus 200.

FIG. 14 is a diagram illustrating an overall configuration of a first modification of the analysis system according to the present embodiment. With reference to FIG. 14, the analysis system according to the first modification differs from the analysis system illustrated in FIG. 1 in that the former is provided with the learning device 300. The learning device 300 is provided with a communication I/F (not shown), and can exchange data with the sample component determination apparatus 200 via the communication I/F.

The learning device 300 includes a learning unit 38 and a learning unit 42. The learning unit 38 and the learning unit 42 have a functional configuration illustrated in FIG. 6. The learning device 300 conducts a learning process on the spectrum generator model 40 and the classifier model 44, and provides the trained spectrum generator model 40 and the trained classifier model 44 to the sample component determination apparatus 200.

In the first modification, the sample component determination apparatus 200 includes a transfer learning unit 46 instead of the learning unit 38 and the learning unit 42. The transfer learning unit 46 is configured to execute a training transfer process by transferring the information of the classifier model 44 which has been trained by the learning device 300 so as to train a new model. For example, if the classifier model 44 has not been trained with the chemical compound containing the target element designated by the user, the transfer learning unit 46 conducts a learning process by using the classifier model 44 provided by the learning device 300 as an initial value. Thereby, the classifier model 44 may be customized to analyze a target element for individual users.

Figure 15:
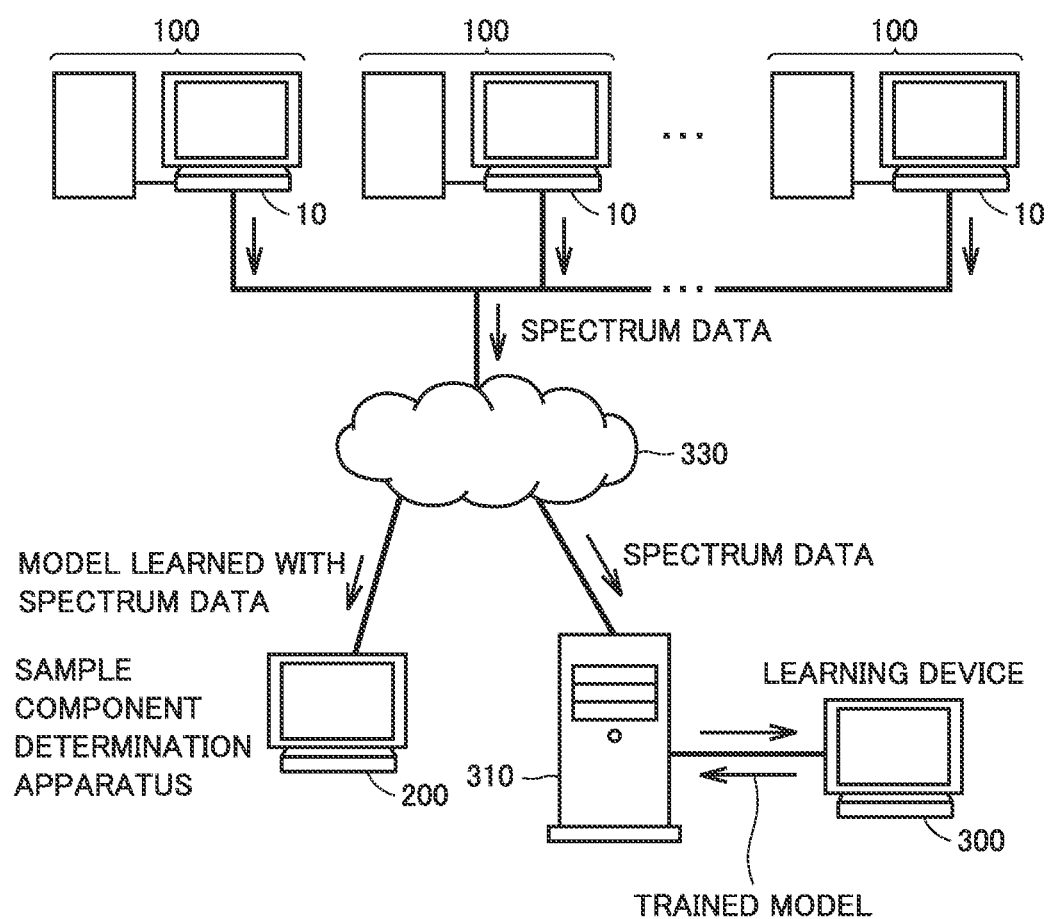
FIG. 15 is a diagram illustrating an overall configuration of a second modification of the analysis system according to the present embodiment.

(2) FIG. 15 is a diagram illustrating an overall configuration of a second modification of the analysis system according to the present embodiment. With reference to FIG. 15, the analysis system according to the second modification differs from the analysis system illustrated in FIG. 1 on the destination from which the sample component determination apparatus 200 acquires the spectrum data. In the second modification, the sample component determination apparatus 200 acquires the spectrum data of the sample S from a server 310 connected to a communication network such as an Internet 330.

In the second modification, a plurality of X-ray analyzers 100 are connected to the Internet 330. The spectrum data of the sample acquired by each X-ray analyzer 100 is accumulated in the server 310 via the Internet 330. The learning device 300 is connected to the server 310, and is configured to conduct a learning process on the spectrum generator model 40 and the classifier model 44 using the plurality of spectrum data accumulated in the server 310. The learning device 300 stores the trained spectrum generator model 40 and the trained classifier model 44 in the server 310. The server 310 is configured to manage the spectrum data obtained by the plurality of X-ray analyzers 100 and manage the trained spectrum generator model 40 and the trained classifier model 44.

The sample component determination apparatus 200 may acquire the trained spectrum generator model 40 and the trained classifier model 44 by accessing the server 310 via the Internet 330. After acquiring the spectrum data of the sample from the server 310, the sample component determination apparatus 200 executes a process (see FIG. 12) of determining the chemical bonding state of the target element contained in the sample using the spectrum generator model 40 and the classifier model 44.

In the second modified example, the learning device 300 may enhance a trained model by adding a target element and/or a chemical compound using the spectrum data stored in the server 310 as appropriate. Thus, the server 310 may provide the model enhanced by the learning device 300 to the sample component determination apparatus 200.

Aspects

It should be noted that the exemplary embodiments described above may be implemented by those skilled in the art according to the following aspects.

First Aspect

A sample component determination method according to one aspect includes: acquiring a spectrum of a sample which is measured by a wavelength dispersive X-ray analyzer; defining a target element to be analyzed in the sample and an input wavelength range corresponding to the target element; and determining a chemical bonding state of the target element in the sample by inputting a partial spectrum of the sample spectrum that falls within the input wavelength range to a first trained model.

According to the sample component determination method described in the first aspect, at the time of performing the state analysis on a sample using the spectrum of the sample measured by the X-ray analyzer, since the user does not need to set complicated analysis conditions and analyze the spectrum waveform, it is possible to simply and easily determine the chemical bonding state of a target element in the sample.

Second Aspect

The sample component determination method according to the first aspect further includes obtaining a shaped spectrum by removing a high-order line peak from the partial spectrum within the input wavelength range. Determining the chemical bonding state includes inputting the shaped spectrum to the first trained model.

According to the sample component determination method according to the second aspect, the chemical bonding state of the target element in the sample may be accurately determined by performing the state analysis on a sample using the shaped spectrum from which the high-order line peak has been removed.

Third Aspect

In the sample component determination method according to the second aspect, obtaining the shaped spectrum includes inputting the partial spectrum within the input wavelength range to a second trained model and obtaining the shaped spectrum as an output from the second trained model.

According to the sample component determination method according to the third aspect, since it is not necessary for the user to set the parameters for removing the high-order line peak, it is possible to simply and easily obtain the shaped spectrum.

Fourth Aspect

In the sample component determination method according to any one of the first to third aspects, the first trained model is created by a learning process using a pair of a spectrum of a chemical compound having a known composition and the composition of the chemical compound as training data.

According to the sample component determination method according to the fourth aspect, the accuracy of the state analysis may be improved by optimizing the first trained model using the training data.

Fifth Aspect

In the sample component determination method according to the third aspect, the second trained model is created by a learning process using, as training data, a pair of a first spectrum that contains the high-order line peak and a shaped spectrum obtained by removing the high-order line peak from the first spectrum and a pair of a second spectrum that does not contain the high-order line peak and a shaped spectrum without removing the high-order line peak from the second spectrum.

According to the sample component determination method according to the fifth aspect, the shaped spectrum may be accurately generated by optimizing the second trained model using the training data.

Sixth Aspect

In the sample component determination method according to the second aspect, obtaining the shaped spectrum includes obtaining the shaped spectrum by subtracting a waveform data fitted to the high-order line peak from the partial spectrum within the input wavelength range.

According to the sample component determination method according to the sixth aspect, it is possible to accurately generate the shaped spectrum.

Seventh Aspect

A sample component determination apparatus according to one aspect includes: a spectrum acquisition unit that acquires a spectrum of a sample which is measured by a wavelength dispersive X-ray analyzer; an input unit that defines a target element to be analyzed in the sample and an input wavelength range corresponding to the target element; a chemical compound determination unit that determines a chemical bonding state of the target element in the sample by inputting a partial spectrum of the sample spectrum that falls within the input wavelength range to a first trained model; and a display unit that displays the determined chemical bonding state.

According to the sample component determination apparatus according to the seventh aspect, at the time of performing the state analysis on a sample using the spectrum of the sample measured by the X-ray analyzer, since the user does not need to set complicated analysis conditions and analyze the spectrum waveform, it is possible to simply and easily determine the chemical bonding state of a target element in the sample.

Eighth Aspect

The sample component determination apparatus according to the seventh aspect further includes a first learning unit that creates the first trained model by a learning process using a pair of a spectrum of a chemical compound having a known composition and the composition of the chemical compound as training data.

According to the sample component determination apparatus according to the eighth aspect, the accuracy of the state analysis may be improved by optimizing the first trained model using the training data.

Ninth Aspect

The sample component determination apparatus according to the seventh or eighth aspect further includes a spectrum shaping unit that obtains a shaped spectrum by removing a high-order line peak from the partial spectrum within the input wavelength range. The chemical compound determination unit inputs the shaped spectrum to the first trained model.

According to the sample component determination apparatus according to the ninth aspect, the chemical bonding state of the target element in the sample may be accurately determined by performing the state analysis on a sample using the shaped spectrum from which the high-order line peak has been removed.

Tenth Aspect

The sample component determination apparatus according to the ninth aspect further includes a second learning unit that creates a second trained model by a learning process using, as training data, a pair of a first spectrum that contains the high-order line peak and a shaped spectrum obtained by removing the high-order line peak from the first spectrum and a pair of a second spectrum that does not contain the high-order line peak and a shaped spectrum without removing the high-order line peak from the second spectrum. The spectrum shaping unit inputs the partial spectrum within the input wavelength range to the second trained model and obtaining the shaped spectrum as an output from the second trained model.

According to the sample component determination apparatus according to the tenth aspect, the shaped spectrum may be accurately generated by optimizing the second trained model using the training data.

Eleventh Aspect

A sample component determination program according to one aspect causes a computer to execute an operation of acquiring a spectrum of a sample which is measured by a wavelength dispersive X-ray analyzer, an operation of defining a target element to be analyzed in the sample and an input wavelength range corresponding to the target element, and an operation of determining a chemical bonding state of the target element in the sample by inputting a partial spectrum of the sample spectrum that falls within the input wavelength range to a first trained model.

According to the sample component determination program according to the eleventh aspect, at the time of performing the state analysis on a sample using the spectrum of the sample measured by the X-ray analyzer, since the user does not need to set complicated analysis conditions and analyze the spectrum waveform, it is possible to simply and easily determine the chemical bonding state of a target element in the sample.

Twelfth Aspect

The sample component determination program according to the eleventh aspect further includes an operation of obtaining a shaped spectrum by removing a high-order line peak from the partial spectrum within the input wavelength range. The operation of obtaining the shaped spectrum includes inputting the partial spectrum within the input wavelength range to a second trained model and obtaining the shaped spectrum as an output from the second trained model, and the operation of determining the chemical bonding state includes inputting the shaped spectrum to the first trained model.

According to the sample component determination program the twelfth aspect, the chemical bonding state of the target element in the sample may be accurately determined by performing the state analysis on the sample using the shaped spectrum from which the high-order line peak has been removed. In addition, since it is not necessary for the user to set the parameters for removing the high-order line peak, it is possible to simply and easily obtain the shaped spectrum.

Thirteen Aspect

A learning method for creating a first trained model and a second trained model used in the sample component determination method according to the third aspect includes: creating the first trained model by a learning process using a pair of a spectrum of a chemical compound having a known composition and the composition of the chemical compound as training data; and creating the second trained model by a learning process using, as training data, a pair of a first spectrum that contains the high-order line peak and a shaped spectrum obtained by removing the high-order line peak from the first spectrum and a pair of a second spectrum that does not contain the high-order line peak and a shaped spectrum without removing the high-order line peak from the second spectrum.

According to the learning method according to the thirteen aspect, the accuracy of the state analysis may be improved by optimizing the first trained model using the training data. Further, by optimizing the second trained model using the training data, it is possible to accurately generate the shaped spectrum.

Fourteenth Aspect

A training program for creating a first trained model and a second trained model used in the sample component determination program according to the twelfth aspect causes a computer to create the first trained model by a learning process using a pair of a spectrum of a chemical compound having a known composition and the composition of the chemical compound as training data and create the second trained model by a learning process using, as training data, a pair of a first spectrum that contains the high-order line peak and a shaped spectrum obtained by removing the high-order line peak from the first spectrum and a pair of a second spectrum that does not contain the high-order line peak and a shaped spectrum without removing the high-order line peak from the second spectrum.

According to the training program according to the fourteenth aspect, the accuracy of the state analysis may be improved by optimizing the first trained model using the training data. Further, by optimizing the second trained model using the training data, it is possible to accurately generate the shaped spectrum.

It is initially intended in the application that the embodiments and the modifications described above may be appropriately combined as long as there is no disadvantage or contradiction.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A sample component determination method comprising:
    irradiating a sample with a wavelength dispersive X-ray analyzer to measure a sample spectrum;
    acquiring the sample spectrum measured by the wavelength dispersive X-ray analyzer;
    defining a target element to be analyzed in the sample and an input wavelength range corresponding to the target element; and
    extracting spectrum data from the sample spectrum within the input wavelength range to obtain a partial spectrum of the sample spectrum; and
    determining a chemical bonding state of the target element in the sample by inputting a partial spectrum of the sample spectrum that falls within the input wavelength range to a first trained model that outputs probabilities indicating a correspondence between the sample and each compound of a plurality of chemical compounds containing the target element.

2. The sample component determination method according to claim 1, further comprising:
    obtaining a shaped spectrum by removing a high-order line peak from the partial spectrum within the input wavelength range,
    wherein determining the chemical bonding state includes inputting the shaped spectrum to the first trained model.

3. The sample component determination method according to claim 2, wherein
    obtaining the shaped spectrum includes inputting the partial spectrum within the input wavelength range to a second trained model and obtaining the shaped spectrum as an output from the second trained model.

4. The sample component determination method according to claim 3, wherein
    the first trained model is created by a learning process using a pair of a spectrum of a chemical compound having a known composition and the composition of the chemical compound as training data.

5. The sample component determination method according to claim 3, wherein
    the second trained model is created by a learning process using, as training data, a pair of a first spectrum that contains the high-order line peak and a shaped spectrum obtained by removing the high-order line peak from the first spectrum and a pair of a second spectrum that does not contain the high-order line peak and a shaped spectrum without removing the high-order line peak from the second spectrum.

6. A learning method for creating the first trained model and the second trained model used in the sample component determination method according to claim 3, comprising:
    creating the first trained model by a learning process using a pair of a spectrum of a chemical compound having a known composition and the composition of the chemical compound as training data; and
    creating the second trained model by a learning process using, as training data, a pair of a first spectrum that contains the high-order line peak and a shaped spectrum obtained by removing the high-order line peak from the first spectrum and a pair of a second spectrum that does not contain the high-order line peak and a shaped spectrum without removing the high-order line peak from the second spectrum.

7. The sample component determination method according to claim 2, wherein
the first trained model is created by a learning process using a pair of a spectrum of a chemical compound having a known composition and the composition of the chemical compound as training data.

8. The sample component determination method according to claim 2, wherein
obtaining the shaped spectrum includes obtaining the shaped spectrum by subtracting a waveform data fitted to the high-order line peak from the partial spectrum within the input wavelength range.

9. The sample component determination method according to claim 1, wherein
the first trained model is created by a learning process using a pair of a spectrum of a chemical compound having a known composition and the composition of the chemical compound as training data.

10. The sample component determination method according to claim 1, further comprising:
inputting the partial spectrum of the sample spectrum to the first trained model,
wherein the first trained model is configured to calculate probabilities indicating the correspondence between the sample and each compound in the chemical compounds from the inputted partial spectrum data and output an arithmetic result including the probabilities indicating the correspondence between the sample and each compound in the chemical compounds.

11. A sample component determination apparatus comprising a wavelength dispersive X-ray analyzer configured to irradiate a sample to measure a sample spectrum and a central processing unit configured to implement:
a spectrum acquisition unit that acquires the spectrum measured by the wavelength dispersive X-ray analyzer and extracts spectrum data from the sample spectrum within an input wavelength range to obtain a partial spectrum of the sample spectrum;
an input unit that defines a target element to be analyzed in the sample and the input wavelength range corresponding to the target element;
a chemical compound determination unit that determines a chemical bonding state of the target element in the sample by inputting a partial spectrum of the sample spectrum that falls within the input wavelength range to a first trained model that outputs probabilities indicating a correspondence between the sample and each compound of a plurality chemical compounds containing the target element; and
a display unit that displays the probabilities indicating the correspondence between the sample and each chemical compound as the determined chemical bonding state.

12. The sample component determination apparatus according to claim 11, further comprising:
a first learning unit that creates the first trained model by a learning process using a pair of a spectrum of a chemical compound having a known composition and the composition of the chemical compound as training data.

13. The sample component determination apparatus according to claim 12, further comprising:
a spectrum shaping unit that obtains a shaped spectrum by removing a high-order line peak from the partial spectrum within the input wavelength range,
wherein the chemical compound determination unit inputs the shaped spectrum to the first trained model.

14. The sample component determination apparatus according to claim 13, further comprising:
a second learning unit that creates a second trained model by a learning process using, as training data, a pair of a first spectrum that contains the high-order line peak and a shaped spectrum obtained by removing the high-order line peak from the first spectrum and a pair of a second spectrum that does not contain the high-order line peak and a shaped spectrum without removing the high-order line peak from the second spectrum,
wherein the spectrum shaping unit inputs the partial spectrum within the input wavelength range to the second trained model and obtains the shaped spectrum as an output from the second trained model.

15. The sample component determination apparatus according to claim 11, further comprising:
a spectrum shaping unit that obtains a shaped spectrum by removing a high-order line peak from the partial spectrum within the input wavelength range,
wherein the chemical compound determination unit inputs the shaped spectrum to the first trained model.

16. The sample component determination apparatus according to claim 15, further comprising:
a second learning unit that creates a second trained model by a learning process using, as training data, a pair of a first spectrum that contains the high-order line peak and a shaped spectrum obtained by removing the high-order line peak from the first spectrum and a pair of a second spectrum that does not contain the high-order line peak and a shaped spectrum without removing the high-order line peak from the second spectrum,
wherein the spectrum shaping unit inputs the partial spectrum within the input wavelength range to the second trained model and obtaining the shaped spectrum as an output from the second trained model.

17. A computer readable non-transitory recording medium which stores a sample component determination program to be executed by a computer, the sample component determination program causing the computer to perform:
an operation of controlling a wavelength dispersive X-ray analyzer to irradiate a sample and measure a sample spectrum;
an operation of acquiring a sample spectrum of a sample which is measured by a wavelength dispersive X-ray analyzer;
an operation of defining a target element to be analyzed in the sample and an input wavelength range corresponding to the target element; and
an operation of extracting spectrum data from the sample spectrum within the input wavelength range to obtain a partial spectrum of the sample spectrum; and
an operation of determining a chemical bonding state of the target element in the sample by inputting a partial spectrum of the sample spectrum that falls within the input wavelength range to a first trained model that outputs probabilities indicating a correspondence between the sample and each compound of a plurality of chemical compounds containing the target element.

18. The computer readable non-transitory recording medium according to claim 17, wherein
the sample component determination program further causes the computer to perform an operation of obtaining a shaped spectrum by removing a high-order line peak from the partial spectrum within the input wavelength range, the operation of obtaining the shaped spectrum includes inputting the partial spectrum within the input wavelength range to a second trained model and obtaining the shaped spectrum as an output from the second trained model, and the operation of determining the chemical bonding state includes inputting the shaped spectrum to the first trained model.

19. A computer readable non-transitory recording medium which stores a training program for creating the first trained model and the second trained model to be used in the sample component determination program according to claim 16, the training program causing the computer to perform:

an operation of creating the first trained model by a learning process using a pair of a spectrum of a chemical compound having a known composition and the composition of the chemical compound as training data; and an operation of creating the second trained model by a learning process using, as training data, a pair of a first spectrum that contains the high-order line peak and a shaped spectrum obtained by removing the high-order line peak from the first spectrum and a pair of a second spectrum that does not contain the high-order line peak and a shaped spectrum without removing the high-order line peak from the second spectrum.

* * * * *